United States Patent Office 3,041,440
Patented June 26, 1962

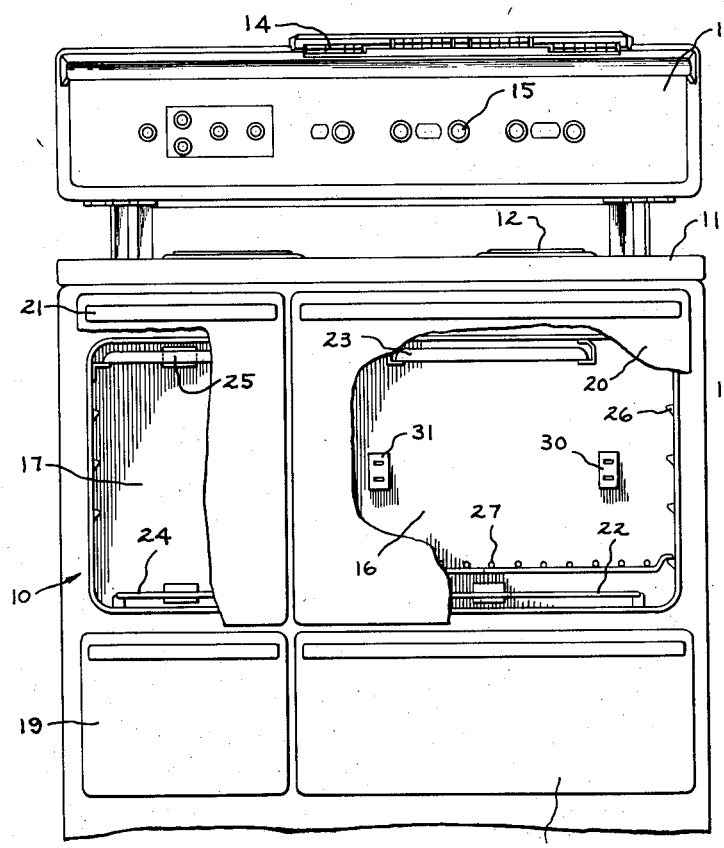
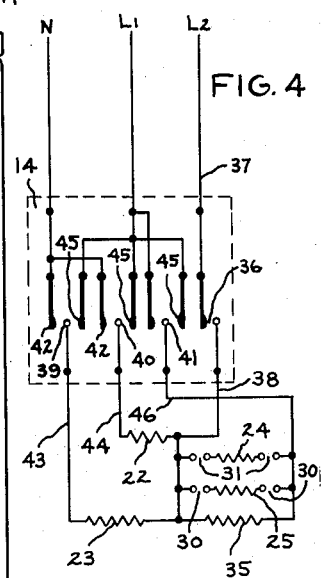
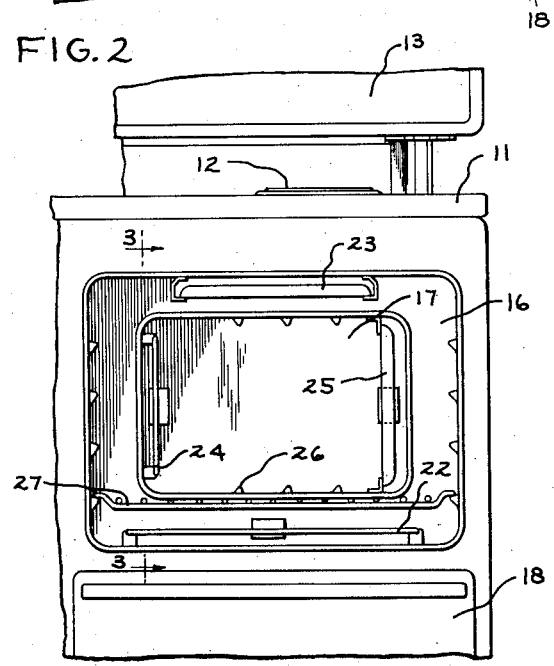

3,041,440
DOUBLE OVEN CLEANING SYSTEM
Raymond L. Dills, Louisville, Ky., assignor to General Electric Company, a corporation of New York
Filed Oct. 21, 1960, Ser. No. 64,049
3 Claims. (Cl. 219—35)

The present invention relates to double oven ranges for domestic use and particularly to an inexpensive means of cleaning the oven liner of the smaller oven.

Probably the major annoyance in using an oven is the difficulty encountered in keeping the walls of the oven liner clean. During the normal cooking operation, food particles and grease spatter often drop on the hot oven surfaces where they are partially burned so that they not only change color to a dark brown, but what is far more objectionable they adhere tenaciously to the surfaces. Strong cleaning agents have been provided for application to the oven walls for the express purpose of removing food soil from them. Even the best of these cleaning agents require a strong rubbing action, and, in any event, it is a very difficult and awkward operation to reach all areas of the oven liner.

This invention is an improvement in the oven described and claimed in the copending application of Bohdan Hurko, Serial No. 27,926, filed May 9, 1960, and assigned to the General Electric Company, assignee of the present invention. The Hurko invention contemplates an automatic heat cleaning cycle for an oven where the temperature of the oven is raised above the normal maximum cooking temperature of about 550° F. to within a range between 750° F. and 950° F. so as to burn off all food soil and leave the walls of the oven cavity perfectly clean.

The principal object of the present invention is to provide a double oven range with a large oven designed for an automatic heat cleaning operation and a removable oven liner for the small oven so that the small liner may be placed in the large oven and both oven liners cleaned simultaneously.

Another object of this invention is to provide a double oven range where the large oven is designed for an automatic heat cleaning operation and the small oven has a removable oven liner with plug-in heating units so that the heating elements remain intact when the small oven liner is inserted into the large oven so that the heating elements of both oven liners are energized for providing heat during the heat cleaning cycle.

The present invention is incorporated in a double oven range which has one large oven and one small oven that are referred to in this art as a master oven and a companion oven respectively. While I have chosen to illustrate my invention with respect to an electric range it should be understood that certain features of the invention are also adaptable to gas ranges without departing from the scope of the invention. Only the large oven has controlled heating means capable of elevating the oven temperature to a level materially in excess of 600° F. in accordance with the aforementioned copending application of Bohdan Hurko for obtaining the self-cleaning of the inner walls of the oven liner. Moreover the large oven is constructed in the manner of the Hurko invention for insulating the oven liner from the front-opening door and the range body so as to restrict the heat loss through the front of the oven and obtain more or less uniform oven wall temperatures. The Hurko invention was developed for a single oven and it would be rather expensive to duplicate the Hurko invention in both ovens of a double oven range. I have solved this problem by rendering the oven liner of the small oven removable and providing the heating elements of the small oven liner with plug-in terminals so that the small oven liner may be withdrawn from the range and positioned in the large oven with the heating elements of the small oven plugged into the back wall of the large oven. Hence, at least one, and preferably more, heating elements of each oven liner will be energized during the heat cleaning cycle to raise the temperature within the large oven to a degree between 750° F. and 950° F. to burn off the food soil from both oven liners simultaneously.

My invention will be better understood from the following description taken in connection with the accompanying drawing and its scope will be pointed out in the appended claims.

FIGURE 1 is a front elevational view of a double-oven free-standing electric range embodying the present invention with both oven doors broken away in part to show the interior construction of the two oven liners;

FIGURE 2 is a fragmentary elevational view of the range of FIGURE 1 showing only the large oven with its front door removed and the small oven liner positioned therein according to the present invention;

FIGURE 3 is a cross-sectional elevational view taken through the large oven on the line 3—3 of FIGURE 2.

FIGURE 4 is an energizing circuit diagram for the large oven showing the heating elements of the small oven connected in the circuit for inclusion in an automatic heat cleaning operation.

Referring in detail to the drawing and in particular to FIGURE 1, there is shown a free-standing electric range 10 having a top cooking surface 11 supporting a plurality of surface heating elements 12, a backsplasher 13 positioned above the cooktop and along the back edge thereof for containing the various electrical components such as pushbutton switches 14 for controlling the heating elements of both the surface units 12 and the oven heaters 22, 23, 24 and 25, and various oven thermostats 15 for controlling the temperature in the pair of ovens 16 and 17 located below the cooktop. The oven 16 is a large oven or master oven while the oven 17 is a small oven or companion oven. Positioned below each oven 16 and 17 is a storage drawer 18 and 19 respectively for the storage of kitchen utensils. Each oven is closed by a front-opening drop door 20 and 21 respectively. Also as in standard range designs each oven has a pair of metal sheathed heating elements. For example, the large oven 16 has a lower bake unit 22 slightly raised off the bottom wall of the oven liner and an upper broil unit 23 located near the top wall of the oven. Similarly the small oven 17 has a lower bake unit 24 and an upper broil unit 25. The two broil units 23 and 25 are fitted with downwardly facing reflector pans to focus the radiant heat energy toward the food to be cooked. The two ovens also include vertically spaced and horizontally extending embossments or ledges 26 formed on the opposite side walls of the oven liners for adjustably supporting a wire rack such as 27 that is adapted to support the food to be cooked in the oven.

The large oven 16 is designed to operate as a heat cleaning oven according to the prior Hurko invention mentioned above. While the details of such a heat cleaning oven have not been illustrated they will be discussed here briefly in order to contribute to a better understanding of this invention. The oven temperature will be raised to a degree between about 750° F. and 950° F. in order to burn off the food soil. This necessitates a thicker wall of insulation around the oven liner so as to restrict the temperature rise in the external surfaces of the range body so that these surfaces will never have a temperature above 194° F. when exposed to the conditions specified by the Underwriters' Laboratories, Inc. and considered as a safe external temperature. Next the oven liner must be supported in the range in such a way that the liner will not lose heat through the range body and especially around the door opening.

A special door construction is made with several layers of panels and a special inner door liner having widely spaced areas of contact with the remainder of the door so as to reduce the conduction of heat through the door. Also there will be an elaborate gasketing arrangement between the oven liner, the door, and the range body to reduce the escape of hot gases and restrict the amount of air that will be drawn into the oven during the heat cleaning cycle. Special electrical controls are necessary for controlling the energization of the heating elements 22 and 23 during normal cooking and later controlling them during the heat cleaning cycle. In order to clean all the food soil from the oven it is necessary to retain more or less uniform oven temperature throughout. Hence, a temperature drop through or around the door would defeat this purpose because the food soil would not be removed from this relatively cool area. Two means are used to advantage to obtain the uniform oven temperature. First, by restricting the amount of heat lost through and around the door; and second, with means for introducing additional heat in this area in the form of a mullion heater (not shown) that is wrapped around the outside of the oven liner near the front thereof and is energized only during the heat cleaning cycle in unison with one or more of the heating elements 22 and 23 for introducing heat into this area and avoiding the necessity for manually cleaning around the door opening in the oven liner after the heat cleaning cycle has been completed.

All of these special precautions which are desirable for a successful heat cleaning oven represent additional cost over and above the usual expense of a domestic range. If a similar design were provided for the small oven 17 the price of the range might be prohibitive for the mass market made up of the average American family. I have solved this problem in a novel manner at a minimum cost by rendering the oven liner of the small oven removable so that it can be placed within the large oven as is done in FIGURE 2. Moreover I have designed special heating elements 24 and 25 for the small oven which are each fixed in the back wall of the oven liner and have terminal portions which extend out through the back thereof for connection in a suitable terminal block (not shown) supported within the range body. Moreover, I have provided suitable electrical connectors 30 and 31 in the back wall of the oven liner of the large oven 16 so that it is possible to unplug the small oven liner by removing it from the range body and turning it on its side and placing it in the large oven so that the two heating elements 24 and 25 may be plugged into the mating connectors 30 and 31 as is best seen in FIGURE 2. The depth of the small oven liner is slightly less than the depth of the large oven liner so that when the small oven liner is telescoped within the large oven liner the oven door 20 may be closed and locked so that the heat cleaning cycle may be started. At least one heating element in each oven liner would be energized simultaneouly during the heat cleaning cycle so that the direct rays of the radiant heat energy would be attacking the food soil.

An energizing circuit diagram for the large oven 16 is shown in FIGURE 4. Electrical power is supplied from a 236 volt source on a 3-wire system identified as N, $L_1$ and $L_2$ having a voltage of 118 volts between each line $L_1$, $L_2$ and the neutral N, and 236 volts across $L_1$ and $L_2$. The controls include a thermostat (not shown) and an oven switch 14. Actually a plurality of circuits are controlled by the oven switch for energizing the bake and boil heating elements 22 and 23 respectively of the large oven 16 for normal cooking operations; and secondly, for adding to the heating circuit of the large oven at least one heating element 24 or 25 of the small oven 17 and a mullion heater 35 wrapped around the throat of the large oven for burning off the food soil from both oven liners simultaneously when the small oven liner is telescoped within the large oven liner.

A multiple-position multi-contact switch 14, which may be of the type disclosed in Patent 2,431,904, granted December 2, 1947, to J. L. Andrews, is connected in circuit with the heating elements and the power supply. The oven switch 14 includes a pair of contacts 36 arranged to connect switch terminals 37 and 38, fixed contacts 39, 40 and 41, a pair of common movable contacts 42 arranged to connect switch terminals 43 and 44 with the neutral N, and three common movable contacts 45 for connecting line $L_1$ with the switch terminals 43 and 44 and 46. A table showing the various circuits for the large oven and the switch contacts which are closed in each of the switch positions is set forth below:

| Switch Position | Circuits | Voltage | |
|---|---|---|---|
| | | Bake (22) | Broil (23) |
| Bake | (N) 42–39, ($L_1$) 45–40 and 36 ($L_2$). | 236 | 118 |
| Broil | ($L_1$) 45–39 and 36 ($L_2$) | | |
| Heat Clean | (N) 42–39, 42–40, 36 ($L_2$), 45–41 ($L_1$). | 118 | 118 |

Note during heat cleaning that the bake and broil units 24 and 25 of the small oven and the mullion heater 35 operate on 236 volts across $L_1$ and $L_2$.

When the oven switch 14 of the large oven 16 is set to a bake position the circuit is from N through contacts 42—39, through broil unit 23, switch contacts 36 to $L_2$ at 118 volts; while there is a second circuit from $L_1$ through contacts 45—40, through bake unit 22 and contacts 36 to $L_2$ at 236 volts. In the broil positive the circuit is through $L_1$, contacts 45–39, broil unit 23, contacts 36 to $L_2$ at 236 volts.

The heat cleaning circuit energizes all five of the heating elements 22, 23, 24, 25 and 35 although it should be understood as explained previously that variations could be made by using only some of the heating elements such as the two bake units 22, 24 and the mullion heater 35. When all the heating elements are energized the circuit is from N, contacts 42—39, through broil unit 23 through contacts 36 to $L_2$ at 118 volts. A second circuit is parallel to the first and is from N, through contacts 42—40, through bake unit 22, and contacts 36 to $L_2$ at 118 volts. A third circuit is from $L_1$, through contacts 45—41, through the three heating units 24, 25 and 35 in parallel, and then through contacts 36 to $L_2$ at 236 volts.

Having described above my novel invention dealing with a double oven range it will readily be apparent to those skilled in this art that I have made it possible to automatically clean the inner walls of the two oven liners at a price which is about equal to the cost of cleaning the single large oven since both oven liners are cleaned simultaneously in the large oven. If there is only a slight amount of food soil in the small oven liner and there is no soil in the large oven it would be possible to remove the small oven liner and carry it to the kitchen sink where the oven liner could be washed clean in the usual manner.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A double-oven electric range having one large oven and one small oven, each oven being formed by an oven liner of box-like construction with an open front wall that is adapted to be closed by a front opening door, each oven liner including at least one heating element, the heating element of the small oven being a plug-in device that is supported within the oven liner, means mounting the small oven liner so that it may be removed from the range together with its heating element and positioned within the large oven, an electrical supply connector located in the large oven liner for receiving the plug-in heating element within the small oven liner in electrical supply relation, means for energizing said connector to energize said plug-in heating element and also for energizing a heating element of said large oven to raise the temperature within the large oven to an amount between 750° F. and 950° F. for burning off the food soil and grease spatter from the inner walls of both oven liners so that the oven liners are in effect self-cleaning.

2. A double-oven electric range having one large oven and one small oven, each oven being formed by an oven liner of box-like construction with an open front wall that is adapted to be closed by a front opening door, each oven liner including a pair of metal sheathed heating elements supported adjacent the top wall and bottom wall thereof, the heating elements of the small oven being attached in the oven liner and having terminals extending through the back wall thereof for plug-in connection with electrical terminal blocks provided therefor and mounted within the range body, means movably mounting the small oven liner so that it may be removed from the range and positioned within the large oven, at least one electrical connector located on the back wall of the large oven liner positioned so that the small oven liner may be turned on a side and positioned within the large oven so that at least one heating element of the small oven may be plugged into the said connector, and means for energizing said connector to energize said heating element and at least one of the heating elements of the larger oven to raise the temperature within the large oven to an amount between 750° F. and 950° F. for burning off the food soil and grease spatter from the inner walls of both oven liners so that the oven liners are in effect self-cleaning.

3. A double-oven electric range as recited in claim 2 wherein the small oven liner is slidably supported on a rack that is suspended from the side walls of the large oven liner.

References Cited in the file of this patent

UNITED STATES PATENTS

| | | |
|---|---|---|
| 2,224,945 | Ames | Dec. 17, 1940 |
| 2,247,626 | Ames | July 1, 1941 |
| 2,944,139 | Harris et al. | July 5, 1960 |